United States Patent
Ikemoto

[11] Patent Number: 6,055,642
[45] Date of Patent: Apr. 25, 2000

[54] SINGLE CHIP CLOCK CONTROL CIRCUIT OPERATING INDEPENDENTLY OF CPU CONTROL

[75] Inventor: Masahiko Ikemoto, Tokyo, Japan

[73] Assignee: Mitsubishi Denki Kabushiki Kaisha, Tokyo, Japan

[21] Appl. No.: 09/115,507

[22] Filed: Jul. 15, 1998

[30] Foreign Application Priority Data

Jan. 20, 1998 [JP] Japan .................................. 10-008569

[51] Int. Cl.[7] ...................................................... G06F 1/32
[52] U.S. Cl. .......................................... 713/322; 713/601
[58] Field of Search ..................................... 713/300–601

[56] References Cited

U.S. PATENT DOCUMENTS

| | | | |
|---|---|---|---|
| 5,546,568 | 8/1996 | Bland et al. .............................. | 713/501 |
| 5,560,017 | 9/1996 | Barrett et al. ............................ | 710/260 |
| 5,754,883 | 5/1998 | Lim et al. ................................. | 710/18 |
| 5,878,251 | 3/1999 | Hagiwara et al. ....................... | 713/601 |

FOREIGN PATENT DOCUMENTS 58-168122  10/1983  Japan ................................ G06F 1/00

*Primary Examiner*—Ayaz R. Sheikh
*Assistant Examiner*—Sumati Lefkowitz
*Attorney, Agent, or Firm*—Burns, Doane, Swecker & Mathis, LLP

[57] ABSTRACT

It is an object to prevent peak power consumption occurring on transition from normal mode to a small power consumption mode. A control-signal generating circuit (4) controls an oscillation circuit (2) and control circuits (3A) and (3B) to realize three types of clock modes including the normal mode in which both of clocks (MC) and (PC) are supplied, a wait mode as a small power consumption mode in which only the clock (PC) is supplied and a stop mode as another small power consumption mode in which supply of both of the clocks (MC) and (PC) is interrupted. Control input signals (EI) and (SI) for instructing to control the control-signal generating circuit (4) are not allowed to pass through a CPU (5) and directly supplied from an ICU (6) in response to the external request signals (ERA) and (ERB). Since the transition to the small power consumption mode does not require the operation of the CPU (5), the peak power consumption can be prevented.

12 Claims, 9 Drawing Sheets

SINGLE CHIP CLOCK CONTROL CIRCUIT OPERATING INDEPENDENTLY OF CPU CONTROL

BACKGROUND OF THE INVENTION

1. Field of the Invention

The present invention relates to a single chip type microcomputer which can satisfactorily be operated by a battery, and more particularly to an improvement for the purpose of realizing transition to a low power consumption mode without excessive consumption of electric power.

2. Description of the Background Art

In recent years, improvement in the performance and size reduction of home electronic products and information devices have rapidly been performed. Among the home electrical products and information devices, small size portable devices have significantly been improved. One of important elements which have realized the foregoing improvement of the small size portable devices is a single chip type microcomputer. The single chip type microcomputer has a structure that all of circuit elements are packed in one semiconductor chip (a semiconductor substrate). Since the microcomputer has been employed to constitute the small size portable device, integration of elements, size reduction and saving of electric power have been realized. In particular, thanks to the size and weight reduction of a battery which is a power source for the small size portable device, the portability of the small size portable device has significantly been enhanced.

3. Structure of Conventional Device

FIG. 8 is a block diagram showing the internal structure of a conventional single chip type microcomputer as a background of the present invention. A microcomputer 150 has main portion of the circuit elements, that is, a main circuit which includes a CPU (Central Processing Unit) 5, an ICU (Interruption Control Unit) 6, a memory 7, an input/output interface 8 and a peripheral circuit 9. The CPU 5 performs calculations in accordance with a program. The memory 7 is a semiconductor storage device in which a program which is executed by the CPU 5 and data which is read and/or written by the CPU 5 are stored. The memory 7 represents all of ROMs and RAMs which can be accessed by the CPU 5.

The input/output interface 8 controls input and output ports for supplying/receiving data to and from an external unit, i.e., functions as an interface for the external unit. The input/output interface 8 includes a parallel interface and/or a serial interface. The peripheral circuit 9 usually includes a timer, an analog-to-digital converter, a digital-to-analog converter and a pulse width modulator.

The ICU 6 controls an interrupting process of the CPU 5. The ICU 6 receives an internal request signal IR transmitted from a timer or the like of the peripheral circuit 9 and supplied through a signal line 91 and receives an external request signal ER supplied through an external terminal 13. The ICU 6 transmits, to the CPU 5, a control signal through a signal line 65 in response to the internal request signal IR and the external request signal ER.

Both internal request signal IR and external request signal ER are signals for requesting the CPU 5 to perform the interrupting process, that is, interruption request signals. The internal request signal IR is generated in the microcomputer 150, while the external request signal ER is supplied from outside of the microcomputer 150. The external terminal 13 is a terminal for relaying the external request signal ER, i.e., the external interruption request signal. That is, the external terminal 13 is an external interruption input terminal.

The circuit elements of the above-mentioned main circuit are connected to one another through three types of bus lines 51, 52 and 53. The bus line 51 is an address bus line for transmitting an address signal. The bus line 52 is a data bus line for transferring data. The bus line 53 is a control-signal bus line for transferring the control signal between the CPU 5 and the other circuit elements.

Clock MC is supplied to a portion (hereinafter tentatively called a "central circuit") of the main circuit except for the peripheral circuit 9, that is, the CPU 5, ICU 6, memory 7 and the input/output interface 8 through a control circuit 3A and a signal line 31A. The clock MC is a clock signal for use in the central circuit, that is, a main system clock signal. The control circuit 3A is a main-system clock output control circuit for controlling output of the clock MC. The signal line 31A is a signal line for transmitting the clock MC, that is, a main system clock line.

On the other hand, the peripheral circuit 9 is supplied with a clock PC through a control circuit 3B and a signal line 31B. The clock PC is a clock signal for use in the peripheral circuit 9, that is, a peripheral circuit clock signal. The control circuit 3B is a peripheral circuit clock output control circuit, the control circuit 3B being arranged to control the output of the clock PC. The signal line 31B is a signal line for transmitting the clock PC, that is, a peripheral circuit clock line.

Each of the control circuits 3A and 3B is supplied with clock source SC through an oscillation circuit 2 and a signal line 21. Terminals 11 and 12 are connected to the oscillation circuit 2. An external oscillator (a ceramic oscillator or a crystal oscillator) (not shown) is connected to each of the terminals 11 and 12. The connected oscillator performs self-excited oscillation by dint of the operation of an oscillation amplifying device provided for the oscillation circuit 2. As a result, the clock source SC is transmitted from the oscillation circuit 2.

The oscillation circuit 2 is provided with a clock-wave shaping circuit which is arranged in such a manner as to shape the waveform of an original oscillation signal in the form of a sine wave generated as a result of the self-excited oscillation of the oscillator into a rectangular wave. Then, the clock-wave shaping circuit divides the frequency of the rectangular wave, if necessary, and then transmits the signal as the clock source SC. As an alternative to the structure in which the oscillator is connected, an external clock having a shaped waveform may be supplied through the terminal 11. At this time, the terminal 12 is opened or a signal having a phase opposite to that of the external clock which is supplied to the terminal 11 is supplied to the terminal 12.

The operations of the control circuits 3A and 3B are controlled by a control-signal generating circuit 4. That is, the control circuit 3A receives a control signal MCS generated by the control-signal generating circuit 4 and supplied through a signal line 41A, that is, a main-system clock control signal. The control circuit 3A outputs the clock source SC as the clock MC and interrupts the output of the clock MC in response to the control signal MCS. Similarly, the control circuit 3B receives a control signal PCS generated by the control-signal generating circuit 4 and supplied through a signal line 41B, that is, a peripheral circuit clock control signal. The control circuit 3B transmits the clock source SC as the clock PC and interrupts the output of the clock PC in response to the control signal PCS.

Also the oscillation circuit 2 is controlled by the control-signal generating circuit 4. That is, the oscillation circuit 2 receives a control signal ECS generated by the control-signal generating circuit 4 and supplied through a signal line 42, that is, an external clock oscillation control signal. The oscillation circuit 2 transmits the clock source SC and interrupts the output of the clock source SC in response to the control signal ECS.

The oscillation circuit 2, the control circuits 3A and 3B and the control-signal generating circuit 4 constitute a reference-clock control circuit 120 for controlling outputs of clocks MC and PC which are reference clocks (system clocks) for the microcomputer 150.

4. Three types of Clock Mode

The control-signal generating circuit 4 generates the control signals MCS, PCS and ECS in response to various trigger signals transmitted from the CPU 5 and the ICU 6. As a result, the control-signal generating circuit 4 is able to realize three types of clock modes in accordance with the process which is performed by the CPU 5 or in response to the external request signal ER or internal request signal IR supplied to the ICU 6. These plural types of clock modes are employed for the purpose of reducing power consumption of the microcomputer 150 in consideration that electric power is supplied from a battery.

In a usual state of operation in which a special instruction is not issued from the CPU 5 or the ICU 6, the control-signal generating circuit 4 realizes a clock mode in which the clocks MC and PC are transmitted, that is, realizes a normal mode. As a result, the central circuit, such as the CPU 5, memory 7 and the like are supplied with the clock MC and thus operates normally. Also the peripheral circuit 9 is supplied with the clock PC and thus operates normally.

That is, the normal mode corresponds to a usual state of operation in which all circuit elements of the main circuit normally operates. In the normal mode, the microcomputer 150 maximally consumes electric power. If power supply voltage having a sufficiently high level is supplied from a battery or the like to the microcomputer 150, the normal mode is, therefore, selected by the CPU 5 or in response to the request signals ER and IR. As a result, the microcomputer 150 fully functions.

When a trigger signal SQ, i.e., a system clock interruption trigger signal is, in the normal mode, generated by the CPU 5 and supplied to the control-signal generating circuit 4 through a signal line 55, the control-signal generating circuit 4 transmits a control signal MCS to the control circuit 3A and thereby instructs the control circuit 3A to interrupt the output of the clock MC. As a result, a clock mode in which the output of the clock MC is interrupted, whereas the output of the clock PC is continued, i.e., a wait mode is realized. At this time, the level of the signal on the signal line 31A is fixed to a certain signal level (a high level or a low level).

In the wait mode, only the peripheral circuit 9 among the main circuit is supplied with the clock PC. Thus, the peripheral circuit 9 continues the normal operation. The operations of the circuit elements of the central circuit, such as the CPU 5, the memory 7 and the like, which operate in synchronization with the clock MC, are interrupted. As a result, a state is realized in which the signals on the bus lines 51, 52 and 53 are not changed. Thus, the power consumption in the microcomputer 150 is considerably reduced as compared with that in the normal mode.

The wait mode is a clock mode employed on the basis of a technique for reducing power consumption. Therefore, transition from the normal mode to the wait mode is selected when the power supply voltage of the microcomputer 150 has been made to be lower than a predetermined reference level. The selection is performed by the CPU 5.

When the trigger signal EQ, i.e., the external clock oscillation interruption trigger signal is, in the normal mode or the wait mode, generated by the CPU 5 and supplied to the control-signal generating circuit 4 through the signal line 54, the control-signal generating circuit 4 transmits the control signal ECS to interrupt the operation of the oscillation circuit 2. As a result, the output of the clock source SC is interrupted so that transmission of both of the clock MC and PC is interrupted. Alternatively as also well known, the control-signal generating circuit 4 transmits the control signal MCS to instruct the control circuit 3A to interrupt output of the clock MC, and simultaneously, transmits the control signal PCS to instruct the control circuit 3B to interrupt output of the clock PC, so that transmission of both of the clocks MC and PC are interrupted.

As a result, a clock mode in which the transmission of the clock MC and that of the clock PC are interrupted, i.e., a stop mode is realized. At this time, signals on the signal liens 31A and 31B are fixed to certain signal levels (a high level or a low level). In the stop mode, the operations of all circuit elements of the main circuit are interrupted. As a result, the power consumption of the microcomputer 150 is further reduced as compared with that in the wait mode. In particular, when the operation of the oscillation circuit 2 is interrupted, the power consumption is furthermore reduced.

That is, the stop mode is a clock mode employed on the basis of a technique which is capable of furthermore reducing power consumption as compared with that in the wait mode. Therefore, transition from the normal mode or the wait mode to the stop mode is usually selected when the power supply voltage which is supplied to the microcomputer 150 has been made to be lower than another predetermined reference value which is lower than the above-mentioned predetermined reference value. Also this selection is performed by the CPU 5.

On the other hand, transition from the sop mode to the wait mode or the normal mode, i.e., release (termination) of the stop mode is performed when the internal request signal IR or the external request signal ER is supplied to the ICU 6. Similarly, transition from the wait mode to the normal mode, i.e., release (termination) of the wait mode is performed when the internal request signal IR or the external request signal ER is supplied to the ICU 6. When the external request signal ER or the internal request signal IR being supplied, the ICU 6 supplies a trigger signal SS to the control-signal generating circuit 4 and the CPU 5 through a signal line 65. As a result, the release of the stop mode and that of the wait mode are performed.

FIG. 9 is a block diagram showing the internal structure of the ICU 6. The external request signal ER supplied through the external terminal 13 (the number of which is not limited to one) and the internal request signal IR supplied through a signal line 91 are latched by a latch circuit 67. That is, the latch circuit 67 is formed as an interruption-request-signal latch circuit.

The latched external request signal ER and internal request signal IR are judged by a judging circuit 68 whether or not interruption has been permitted. That is, the judging circuit 68 is formed as an interruption permission judging circuit. If the clock mode is in the wait mode or the stop mode, the external request signal ER or the internal request signal IR supplied to release these modes is so judged that the interruption thereof is permitted.

The external request signal ER or the internal request signal IR permitted by the judging circuit 68 to interrupt is supplied to a determination circuit 69. The determination circuit 69 is prepared as an interruption priority order determination circuit which selects a request signal having the highest order from the plurality of the supplied request signals and transmits the selected signal to the signal line 65 as the trigger signal SS.

5. Transition of Clock Mode

Referring back to FIG. 8, the operation of each unit performed at the transition of the clock mode will now be described. Initially, the transition between the normal mode and the wait mode will now be described.

Presupposing that the transition from the wait mode to the normal mode takes place in response to the internal request signal IR, the CPU 5 sets a timer (not shown) included in the peripheral circuit 9 at the transition from the normal mode to the wait mode. Specifically, predetermined data is written in an operation-mode register (not shown) attached to the timer so that a time of occurring of the clock mode transition is set to the timer. Presupposing that the transition from the wait mode to the normal mode occurs in response to the external request signal ER, the timer is not required to be set.

Simultaneously, the CPU 5 performs predetermined setting for the ICU 6. As a result, when the ICU 6 receives the internal request signal IR generated by the timer through the signal line 91, or when the ICU 6 receives the external request signal ER through the external terminal 13, the ICU 6 is brought to a state in which the ICU 6 is able to transmit the trigger signal SS for instructing the release of the wait mode. After the above-mentioned setting operations have been completed, the trigger signal SQ for instructing the clock MC to be fixed is supplied from the CPU 5 to the control-signal generating circuit 4. As a result, the transition from the normal mode to the wait mode is completed in the way described above.

The trigger signal SQ is transmitted when a wait instruction, which is a specific instruction, is executed by the CPU 5 or when writing or reading with respect to a mode entry register (a specific register controlling transition to the wait mode or the stop mode) is performed because the CPU 5 executes the access instruction. As described above, the operation of the CPU 5 is required when the transition from the normal mode to the wait mode is performed.

In the wait mode, the peripheral circuit 9 including the timer continues their operations. Therefore, if the timer has been set, the timer transmits the internal request signal IR when the set time has passed. The internal request signal IR is the internal interruption request signal for requesting the release of the wait mode. The internal request signal IR is supplied to the ICU 6 through the signal line 91.

When the internal request signal IR or the external request signal ER has been supplied to the ICU 6, the ICU 6 supplies the trigger signal SS for instructing restart of supply of the clock MC to the control-signal generating circuit 4 through the signal line 65. Simultaneously, the ICU 6 supplies a predetermined request signal for requesting interruption to the CPU 5 through the foregoing signal line 65.

As a result, supply of the clock MC from the control circuit 3A is started so that the central circuit including the CPU 5 is brought to the operable state. The CPU 5 initially executes the predetermined interruption process in response to the predetermined request signal supplied from the ICU 6. As a result, the CPU 5 restarts the processes in the normal mode, such as data transfer and calculations.

The transition between the normal mode and the stop mode will now be described. Since also the operation of the peripheral circuit 9 is interrupted in the stop mode, the release of the stop mode is not performed in response to the internal request signal IR. The stop mode is released in response to only the external request signal ER. Therefore, the timer of the peripheral circuit 9 is not set when the transition from the normal mode to the stop mode occurs.

On the transition from the normal mode to the stop mode, the CPU 5 performs a predetermined setting for the ICU 6. As a result, the ICU 6 is enabled to transmit the trigger signal SS for instructing the release of the stop mode when the external request signal ER has been supplied to the ICU 6 through the external terminal 13. After the above-mentioned setting has been completed, the trigger signal EQ for instructing fixation of both of the clock MC and clock PC or fixation of the clock source SC is supplied from the CPU 5 to the control-signal generating circuit 4. As a result, the transition from the normal mode to the stop mode is completed in the way described above.

The trigger signal EQ is transmitted when the CPU 5 executes a stop instruction which is one of the specific instructions or when writing in or reading from the mode entry register is performed because the CPU 5 executes an access instruction. As described above, the operation of the CPU 5 is required when the transition from the normal mode to the stop mode is performed.

When the ICU 6 is supplied with the external request signal ER during the stop mode, the ICU 6 supplies the trigger signal SS for instructing supply of the clock MC and the clock PC or restart of the supply of the clock source SC to the control-signal generating circuit 4 through the signal line 65. Simultaneously, the ICU 6 supplies a predetermined request signal for requesting execution of the interruption to the CPU 5 through the same signal line 65.

As a result, supply of the clocks MC and PC is started so that the central circuit, which includes the CPU 5, and the peripheral circuit 9 are brought to operable state. The CPU 5 initially executes a predetermined interruption process in response to a predetermined request signal supplied from the ICU 6. As a result, the CPU 5 restarts the processes of the normal mode, such as the data transfer and calculations.

On the transition from the wait mode to the stop mode, each unit operates similarly to that on the transition from the normal mode to the stop mode operates. That is, the CPU 5, the operation of which has been suspended during the wait mode temporarily, restarts the operation to perform the transition of the clock mode from the wait mode to the stop mode, and thereby performs a predetermined operation for the ICU 6 and the control-signal generating circuit 4. For this purpose, also the supply of the clock MC is, although temporarily, restarted. That is, the transition from the wait mode to the stop mode is performed in such a manner that the clock mode is temporarily returned to the normal mode.

Also the transition from the stop mode to the wait mode is performed similarly to the transition from the stop mode to the normal mode. That is, the transition from the stop mode to the wait mode is started in response to the external request signal ER supplied to the ICU 6 through the external terminal 13. More specifically, when the ICU 6 is supplied with the external request signal ER during the stop mode, the ICU 6 supplies the trigger signal SS for instructing restart of supply of the clock PC or the clock source SC to the control-signal generating circuit 4 through the signal line 65.

As a result, the supply of the clock PC is started so that the peripheral circuit 9 is brought to the operable state. Differently from the transition to the normal mode, the trigger signal SS is not supplied to the CPU 5. Thus, the transition to the wait mode is completed without the CPU 5 performing the interruption process.

As described above, the microcomputer 150 is so structured that the transition of the operating state is performed among three clock modes in response to the level of the power supply voltage. Therefore, power consumption can significantly be reduced. As a result, the above-mentioned microcomputer has widely been used in a small-size portable device having a battery as a power source.

However, the microcomputer 150 which is a conventional device suffers from excessively large power consumption when transition of the clock mode to a small power consumption mode (a clock mode, such as the wait mode or stop mode, which is a clock mode different from the normal mode, for reducing power consumption) is performed as will be described below.

As described above, all of the transition from the normal mode to the wait mode, from the normal mode to the stop mode and from the wait mode to the stop mode are performed when the CPU 5 executes a specific instruction, such as the wait instruction or the stop instruction or when writing in or reading from the mode entry register is performed because the CPU 5 executes the access instruction. That is, the transition to the small power consumption mode requires the operation of the CPU 5 and the reading operation of the memory 7 to be read by the CPU 5.

In order to perform the above-mentioned operation, the microcomputer 150, despite temporarily, consumes electric power in a quantity considerably large as compared with the power consumption in the wait mode or the stop mode. The peak power consumption which takes place on the transition to the small power consumption mode sometimes raises a critical problem for a small size portable device which require a battery as the power source.

If a device having the microcomputer 150 mounted thereof is operated by a battery, there is apprehension that the remaining quantity of electric power in the battery is reduced and the power supply voltage supplied from the battery is reduced to a level (the operating limit voltage) corresponding to the operating limit for the CPU 5. Also in this case, the transition of the clock mode from the wait mode to the stop mode for the purpose of reducing power consumption requires the above-mentioned operation which consumes large electric power despite temporarily.

Also in a case where the transition of the clock mode from the normal mode to the wait mode is required during the normal mode because of the reduction in the power supply voltage from the battery, the transition to the wait mode inevitably encounters the peak power consumption. Thus, when the remaining electric power in the battery has been reduced and thus power consumption must be reduced, consumption of large electric power, which runs counter the power saving, must be performed despite temporarily.

Therefore, when the transition to the small power consumption mode is performed because of small remaining electric power, electric power is consumed at a peak level. Accordingly, the power supply voltage from the battery has sometimes been reduced to the operating limit level for the CPU 5. As a result, the CPU 5 cannot sometimes normally be operated, thus sometimes causing runaway thereof. If runaway of the CPU 5 takes place, data stored in a volatile memory, such as a RAM, included in the memory 7 cannot always normally be stored because of the unexpected operation of the CPU 5. Therefore, the CPU 5 cannot sometimes be restored to the previous state even after the voltage of the battery has been restored to the normal level.

SUMMARY OF THE INVENTION

To solve the above-mentioned problems experienced with the conventional device, an object of the present invention is to provide a microcomputer in which transition to a small power consumption mode is permitted without peak power consumption.

According to a first aspect of the present invention, there is provided a microcomputer of single chip type wherein circuit elements are integrated in a single semiconductor chip, comprising as part of the circuit elements: main circuit and reference-clock control circuit for supplying a clock to the main circuit, wherein the main circuit includes at least a CPU, a memory which is accessed by the CPU and an ICU for controlling an interruption process which is performed by the CPU in response to a supplied interruption request signal.

The reference-clock control circuit makes transition between two modes in response to supplied control input signals, the two modes being a normal mode in which the clock is supplied to all of circuits included in the main circuit which are operated in synchronization with the clock and a small power consumption mode in which supply of the clock to at least a portion of the circuits including the CPU in the main circuit is interrupted.

The microcomputer further comprises, as part of the circuit elements: an external terminal for relaying, to the ICU, an external request signal supplied from outside as the interruption request signal; and a signal line for transmitting a signal outputted by the ICU in response to the external request signal to the reference-clock control circuit as the control input signal without relay of the signal by the CPU.

According to a second aspect of the present invention, there is provided a microcomputer according to the first aspect, further comprising, as part of the circuit elements, another external terminal for relaying, to the signal line, an external input signal supplied from outside as the control input signal.

According to a third aspect of the present invention, there is provided a microcomputer according to the first or second aspect of the present invention, wherein the main circuit further includes a peripheral circuit which generates and transmits an internal request signal to the ICU as the interruption request signal, and the ICU also responds to the internal request signal so as to transmit the control input signal.

According to a fourth aspect of the present invention, there is provided a microcomputer according to the first or second aspect of the present invention, wherein the main circuit further includes a peripheral circuit for generating an internal request signal as the control input signal so as to transmit the same to the signal line.

According to a fifth aspect of the present invention, there is provided a microcomputer according to the third or fourth aspect of the present invention, wherein the small power consumption mode includes a wait mode in which only supply of the clock to the peripheral circuit is interrupted and a stop mode in which supply of the clock to any circuit included in the main circuit is interrupted, and the reference-clock control circuit further makes transition between the wait mode and the stop mode in response to the control input signal.

According to a sixth aspect of the present invention, there is provided a microcomputer according to the fifth aspect of the present invention, further comprising a power-supply-voltage detection circuit as part of the circuit elements, wherein the power-supply-voltage detection circuit monitors source voltage which is supplied to the microcomputer so as to transmit a signal to instruct transition to the wait mode when the source voltage reduces to a level lower than a predetermined first reference voltage, and to transmit a signal to instruct transition to the stop mode when the source voltage reduces to a level lower than a predetermined second reference voltage, the power-supply-voltage detection circuit to the signal line as the control input signal.

According to a seventh aspect of the present invention, there is provided a microcomputer according to the fifth or sixth aspect of the present invention, wherein the reference-clock control circuit includes: an oscillation circuit for generating a clock source; a first control circuit for supplying the clock source as the clock to each circuit requiring the clock included in the main circuit except for the peripheral circuit; a second control circuit for supplying the clock source to the peripheral circuit as the clock; and a control-signal generating circuit which supplies a control signal to the first and second control circuits in response to the control input signal so as to execute a control of the first and second control circuits.

The control-signal generating circuit so executes the control that both of the first and second control circuits interrupt supply of the clock when the control input signal instructs transition to the stop mode, the first control circuit interrupts supply of the clock and the second control circuit supplies the clock when the control input signal instructs transition to the wait mode, and both of the first and second control circuits supply the clocks when the control input signal instructs transition to the normal mode.

According to an eighth aspect of the present invention, there is provided a microcomputer according to the fifth and sixth aspect of the present invention, wherein the reference-clock control circuit includes: an oscillation circuit for generating a clock source; a first control circuit for supplying the clock source as the clock to each circuit requiring the clock included in the main circuit except for the peripheral circuit; a second control circuit for supplying the clock source to the peripheral as the clock; and a control-signal generating circuit which supplies a control signal to the oscillation circuit and the first control circuit in response to the control input signal so as to execute a control of the oscillation circuit and the first control circuit.

The control-signal generating circuit so executes the control that the oscillation circuit interrupts generation of the clock source when the control input signal instructs transition to the stop mode, the oscillation circuit generates the clock source and the first control circuit interrupts supply of the clock when the control input signal instructs transition to the wait mode, and the oscillation circuit generates the clock source and the first control circuit supplies the clock when the control input signal instructs transition to the normal mode.

In the device according to the first aspect of the present invention, the control input signal is supplied from the ICU to the reference clock control circuit for realizing the two clock modes in response to the control input signal, and the CPU does not intervene the supply of the control input signal. Therefore, the peak power consumption which occurs on the transition to the low power consumption mode in the conventional device is prevented. Accordingly, a problem of a malfunction of the device is prevented.

The device can be realized only by changing the wiring connected from the CPU to the reference-clock control circuit to the wiring connected from the ICU to the reference-clock control circuit. More specifically, only by changing the mask pattern for realizing the wiring pattern during the manufacturing process of the semiconductor chip, and by using other resources relating to the manufacturing process of the conventional device as it is, the new and characteristic device is realized. Therefore, the cost of the manufacturing process can be reduced. Moreover, the device is obtained without the size of the device, i.e., the area of the chip enlarged as compared with the conventional device.

The device according to a second aspect of the present invention enables the control input signal to directly be supplied to the reference-clock control circuit without the control input signal passed through the ICU. Therefore, a portion of the control input signal, for example, instructing either the transition to the small power consumption mode or release of the same, or transition to a specific mode of the small power consumption mode if the small power consumption mode includes a plurality of modes and release of the same can directly be supplied to the reference-clock control circuit without passage through the ICU. Thus, the structure of the ICU can be simplified.

The device according to a third aspect of the present invention comprises the peripheral circuit which is connected to the ICU. Therefore, the internal request signal may be generated by, for example, the timer and the transition from the small power consumption mode to the normal mode can be realized in response to the internal request signal.

The device according to the fourth aspect of the present invention comprises the peripheral circuit the output from which is directly supplied to the reference-clock control circuit as the control input signal. Therefore, the internal request signal may be generated by, for example, the timer and the transition from the small power consumption mode to the normal mode can be realized in response to the internal request signal. Since there is not intervention of the ICU, the structure of the ICU can be simplified.

In the device according to the fifth aspect of the present invention, the reference-clock control circuit has two modes as the small power consumption mode, i.e., the wait mode in which the peripheral circuit continues the operation and the stop mode in which all circuits included in the main circuit are interrupted and power consumption is furthermore effectively reduced. The transition between the two modes can be realized in response to the control input signal. Therefore, a further practical reduction in the power consumption can be realized.

The device according to the sixth aspect of the present invention includes the power-supply-voltage detection circuit. Therefore, an external power-supply-voltage detection circuit is not required. Thus, the device to which the device according to the present invention is applied can easily be designed, and the size of the device can furthermore be reduced.

In the device according to the seventh aspect of the present invention, both of the first and second control circuits interrupt the supply of the clock to thereby realize the stop mode. Therefore, the resources relating to the manufacturing process of a simple type of a conventional device which realizes the stop mode without the interruption of the oscillation circuit can effectively be used.

In the device according to the eighth aspect of the present invention, the supply of the clock source from the oscillation circuit is interrupted to thereby realize the stop mode. Therefore, power consumption can significantly be reduced in the stop mode.

These and other objects, features, aspects and advantages of the present invention will become more apparent from the following detailed description of the present invention when taken in conjunction with the accompanying drawings.

DESCRIPTION OF THE PREFERRED EMBODIMENTS

Outline of Preferred Embodiments

Microcomputers according to preferred embodiments of the present invention will now be described. Also the device according to the preferred embodiments are single chip type microcomputers similarly to the conventional microcomputer 150 shown in FIGS. 8 and 9. The devices according to the present invention are characteristically different from the conventional device 150 in that the transition to the small power consumption mode is performed without the operation of the CPU 5. As a result, the power consumption at the peak level which takes place on the transition to the small power consumption mode can be prevented.

Moreover, the above-mentioned operation is enabled by changing only the wiring of the conventional device 150. More specifically, each of the preferred embodiments can be realized mainly by changing the upper wiring pattern of the semiconductor chip forming the conventional device 150, in other words, by only changing the mask pattern for forming the wiring pattern. Thus, the conventional device 150 can be modified to the device according to the present invention.

The small power consumption mode which does not raise the power consumption at the peak level is released (terminated) similarly to the conventional device 150. That is, the small power consumption mode can be released by a similar structure and a similar operation to those of the conventional device 150.

Figure 6:
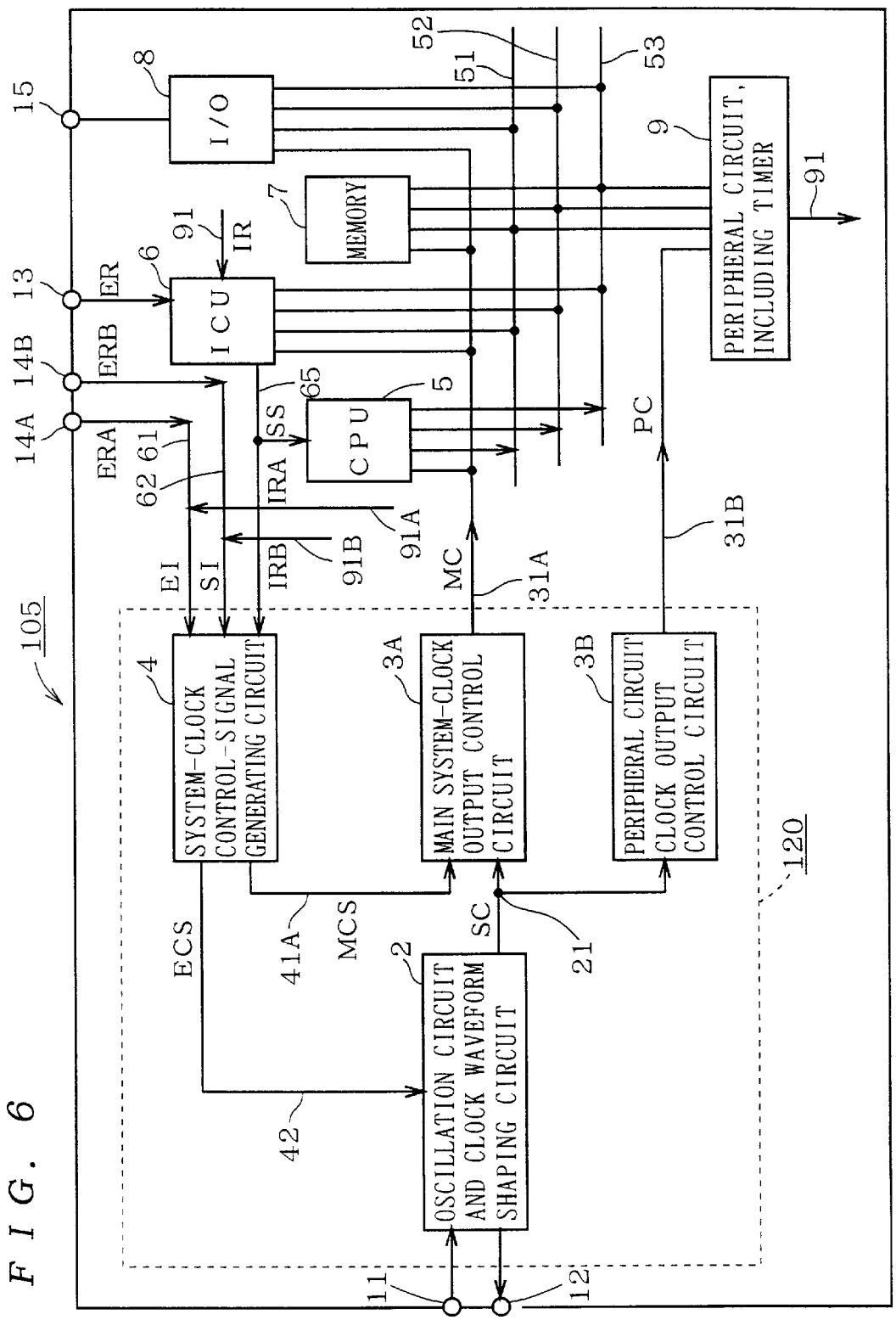
FIG. 6 is a block diagram showing a device according to a fifth preferred embodiment.
Figure 7:
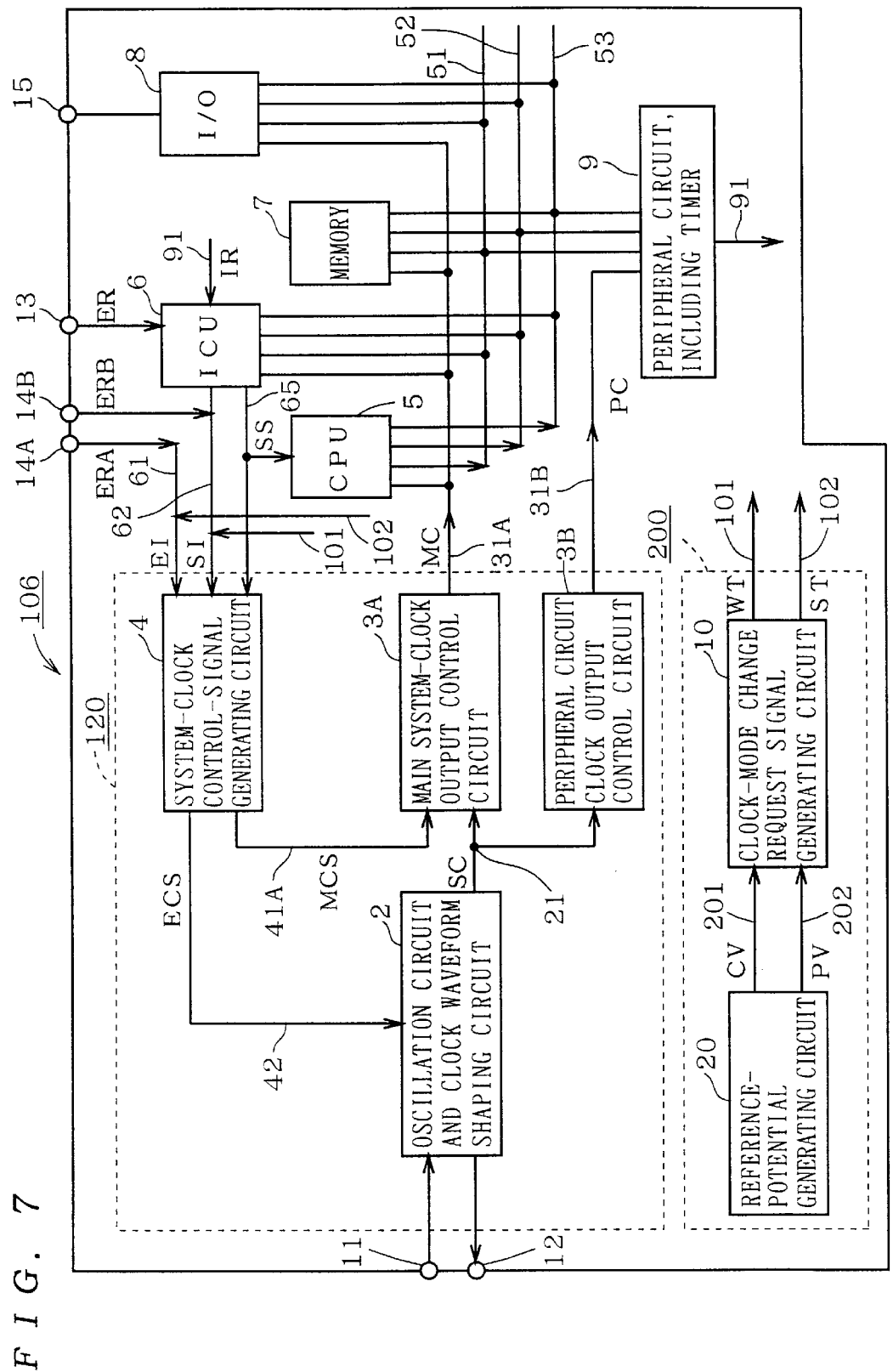
FIG. 7 is a block diagram showing a device according to a sixth preferred embodiment.
Figure 8:
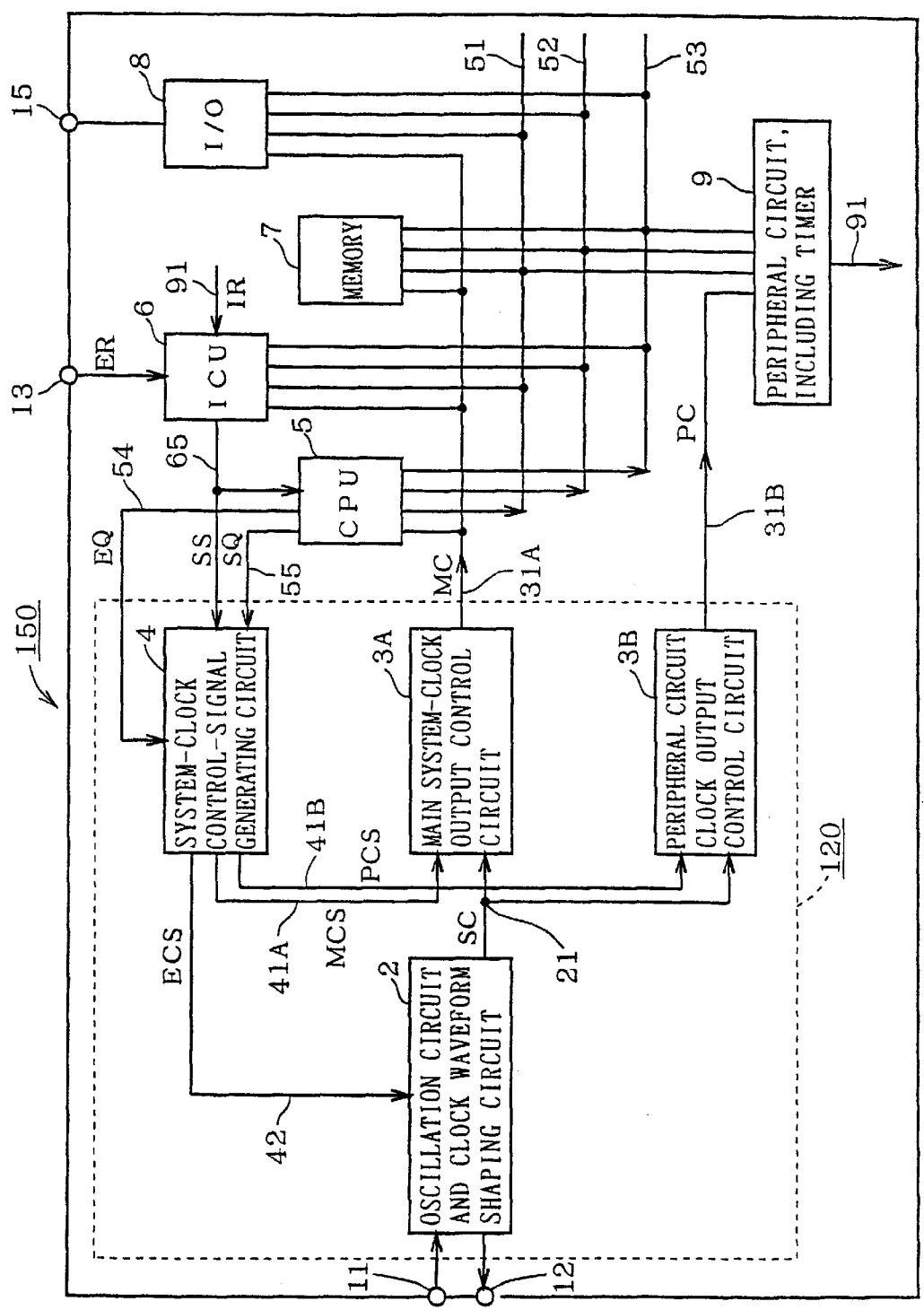
FIG. 8 is a block diagram showing a conventional device.
Figure 9:
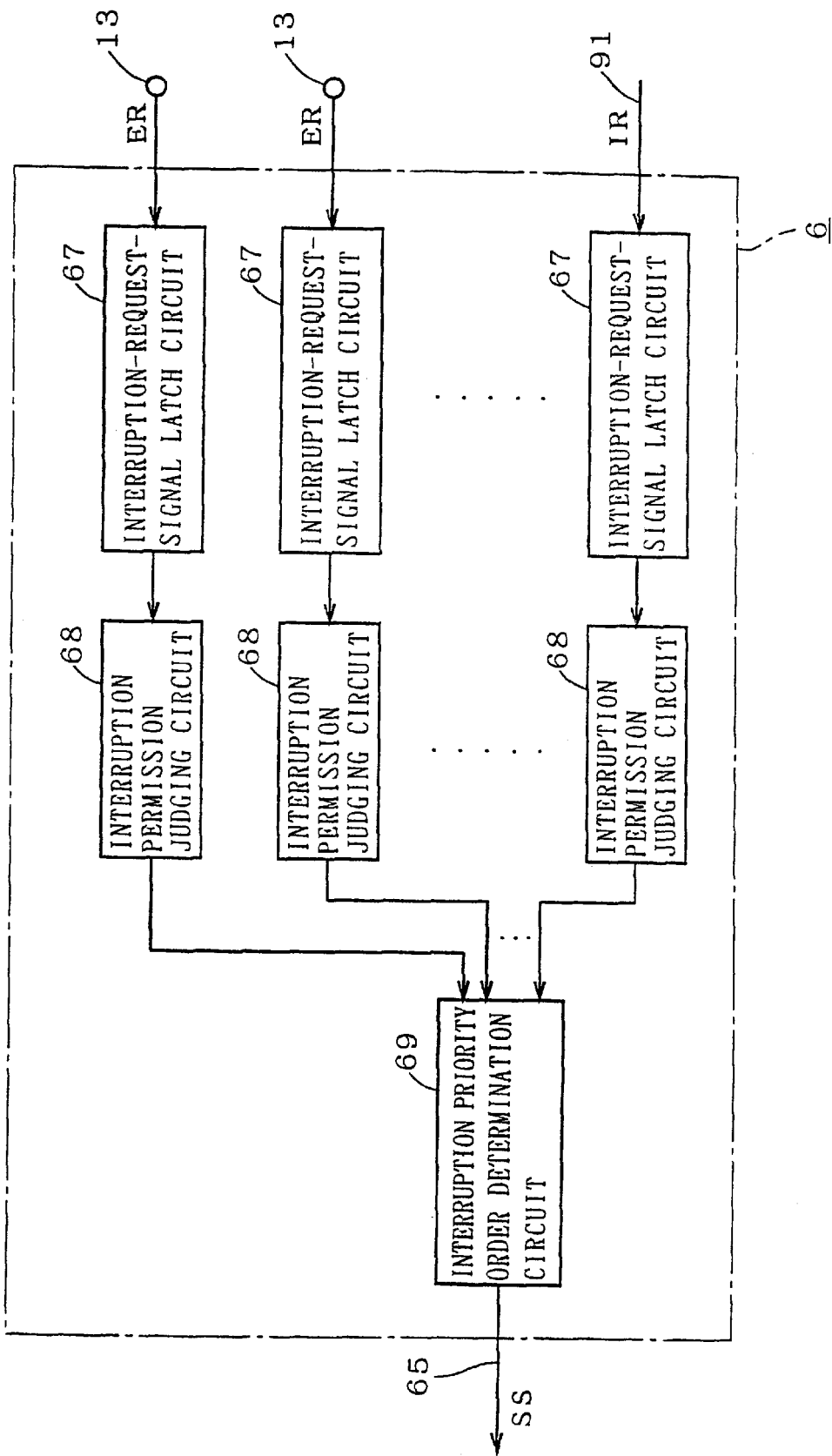
FIG. 9 is an internal block diagram showing a conventional ICU.

To simplify the description of the following preferred embodiments, the elements shown in FIGS. 1 to 7 which are the same as those shown in FIGS. 8 and 9 are given the same reference numerals and the same elements are omitted from description.

First Preferred Embodiment

Figure 1:
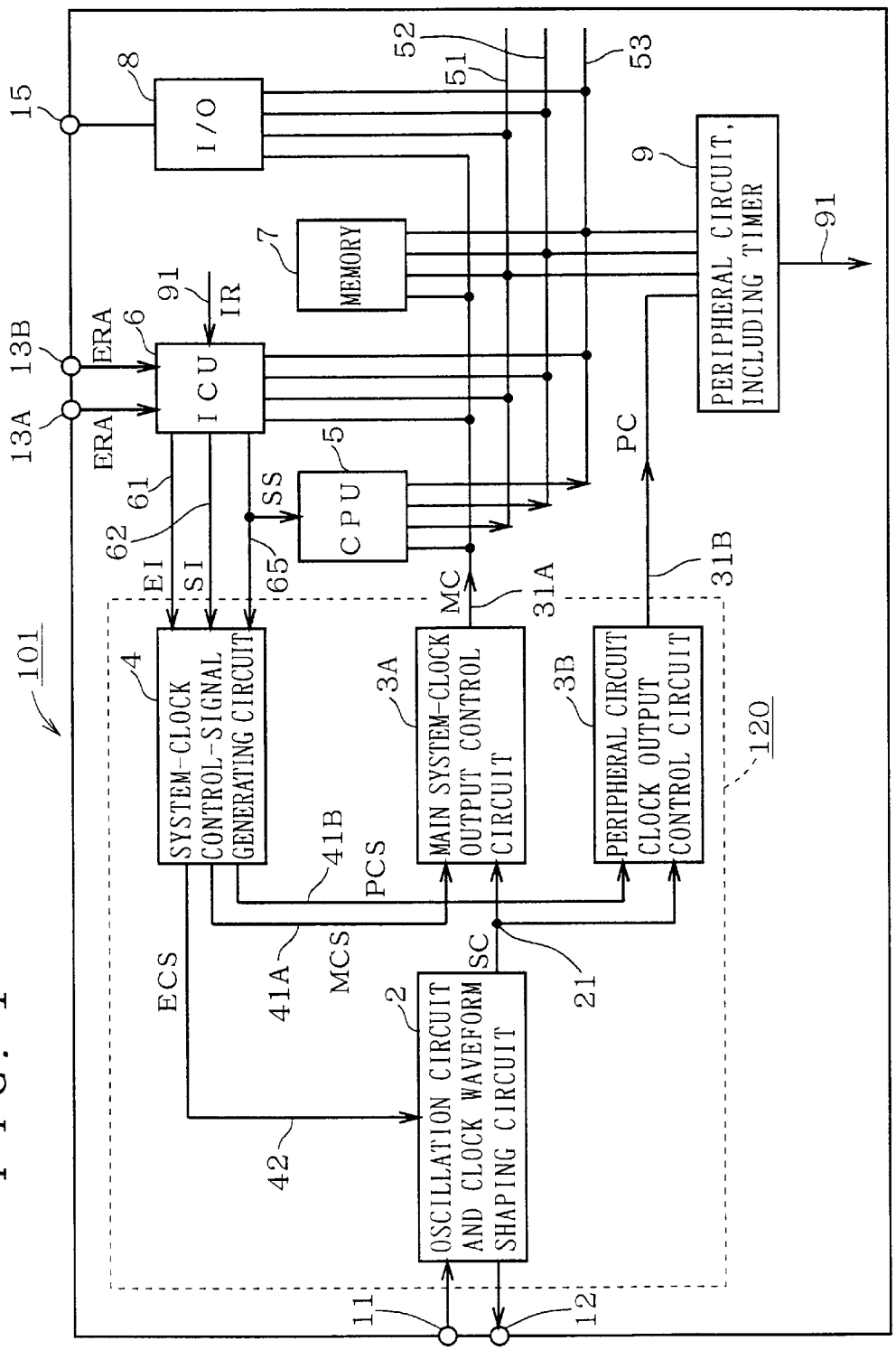
FIG. 1 is a block diagram showing a device according to a first preferred embodiment.

FIG. 1 is a block diagram showing the structure of a microcomputer according to a first preferred embodiment of the present invention. A microcomputer 101 has a structure in which the signals 54 and 55 (see FIG. 8) for transmitting the trigger signals EQ and SQ from the CPU 5 to the control-signal generating circuit 4 are removed. As an alternative, the microcomputer 101 has signal lines 61 and 62 which transmit, from the ICU 6 to the control-signal generating circuit 4, a control input signal EI for controlling the output of the control signal ECS and a control input signal SI for controlling outputs of the control signals MCS and PCS.

The control input signal EI is an external clock control input signal for instructing the control-signal generating circuit 4 to transmit the control signal ECS so as to control the oscillation circuit 2. The signal line 61 is an external clock control input signal line for transmitting the battery signal. On the other hand, the control input signal SI is a system clock control input signal for instructing the control-signal generating circuit 4 to transmit the control signals MCS and PCS so as to control the control circuits 3A and 3B. The signal line 62 is a system clock control input signal line for transmitting the above-mentioned signal.

Figure 2:
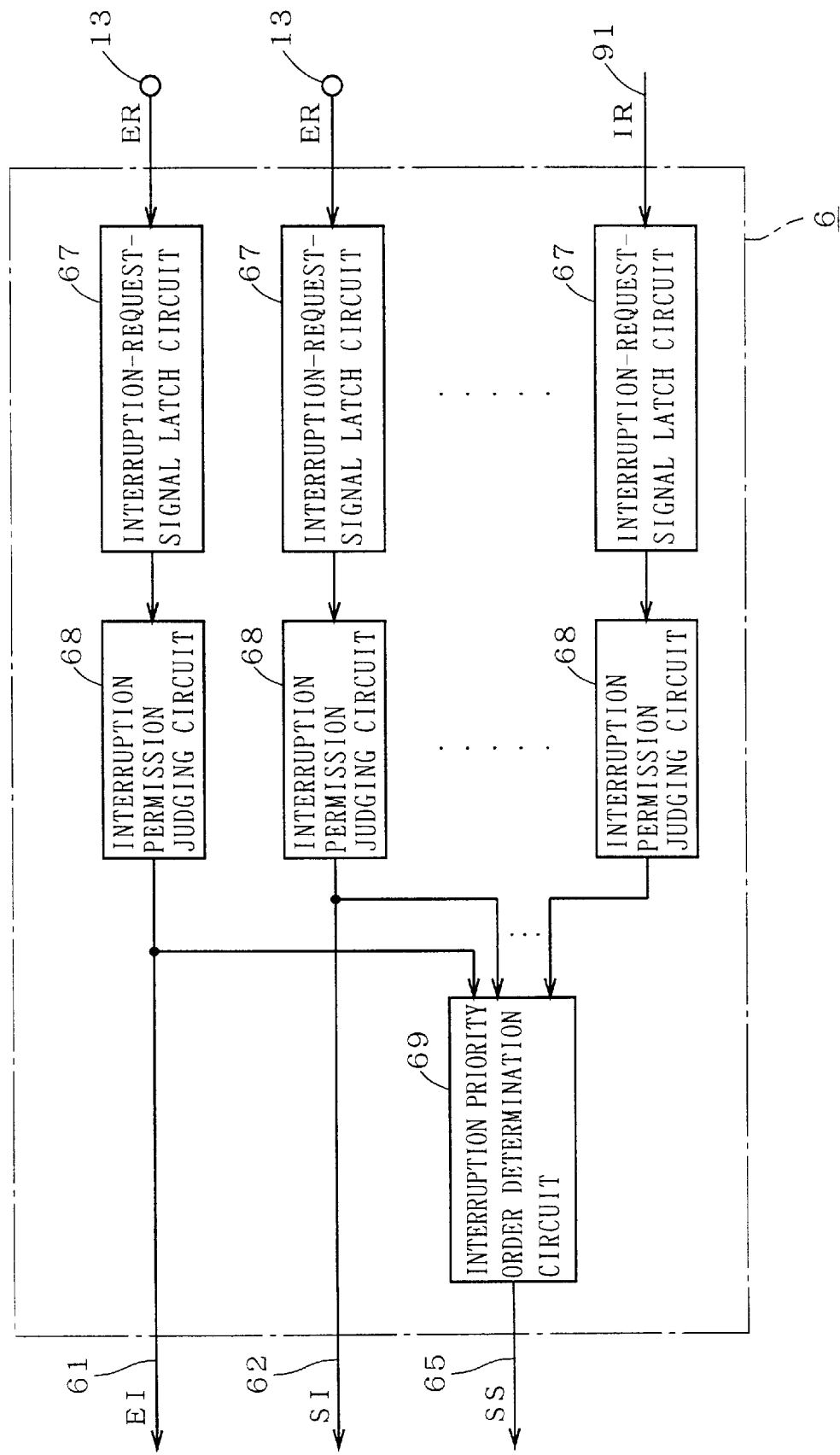
FIG. 2 is an internal block diagram of an ICU according to the first preferred embodiment.

The control input signals EI and SI are transmitted from the ICU 6 in response to external request signals ERA and ERB which are supplied to the ICU 6 through external terminals 13A and 13B. FIG. 2 is a block diagram showing the internal structure of the ICU 6 of the device 101. As shown in FIG. 2, the signal lines 61 and 62 for transmitting the control input signals EI and SI are directly connected to the output of the judging circuit 68.

Referring back to FIG. 1, an external power-supply-voltage detection circuit (not shown) is usually connected to the device 101 similarly to the conventional device 150 when the device 101 is used. The power-supply-voltage detection circuit is a circuit for monitoring the power supply voltage which is supplied to the device 101. The power-supply-voltage detection circuit transmits a first predetermined signal when the power supply voltage has been lowered to a predetermined first reference voltage, for example, the operating limit voltage for the CPU 5. When the power supply voltage has been lowered to a second reference voltage, for example, the operating limit voltage for the ICU 6, the power-supply-voltage detection circuit transmits a second predetermined signal.

The microcomputer 101 receives the first and second predetermined signals through the external terminal 13A and 13B. The received signals are transmitted to the ICU 6 as external request signals ERA and ERB.

When transition of the clock mode from the normal mode to the wait mode is performed, each element of the microcomputer 101 is operated as follows.

When the clock mode is the normal mode, the judging circuit 68 of the ICU 6 are set to permit the external request signals ERA and ERB. Therefore, when the power-supply-voltage detection circuit has detected that the power supply voltage has been lowered to the first reference voltage and thus the external request signal ERA has been supplied to the ICU 6, the external request signal ERA is transmitted to the control-signal generating circuit 4 as the control input signal SI. When the control-signal generating circuit 4 has received the control input signal SI, the control-signal generating circuit 4 is operated similarly to the case where the control-signal generating circuit 4 receives the trigger signal SQ (see FIG. 8).

The control-signal generating circuit 4 transmits the control signal MCS to the control circuit 3A so as to instruct the control circuit 3A to fix the output of the clock MC. As a result, the wait mode is realized in which the clock MC is fixed and output of the clock PC is continued. As described above, the transition from the normal mode to the wait mode can be realized in the microcomputer 101 by the input of the external request signal ERA without the operation of the CPU 5.

When the transition of the clock mode from the wait mode to the stop mode is performed, each element of the microcomputer 101 is operated as follows.

During the wait mode, the setting of the ICU 6 established in the normal mode is maintained. Therefore, when the external power-supply-voltage detection circuit has detected that the power supply voltage has been lowered to the second reference voltage and thus the external request signal ERB has been supplied to the ICU 6, the external request signal ERB is transmitted to the control-signal generating circuit 4 as the control input signal EI. When the control-signal generating circuit 4 has received the control input signal EI, the control-signal generating circuit 4 is operated similarly to the case in which the control-signal generating circuit 4 receives the trigger signal EQ (see FIG. 8).

Specifically, the control-signal generating circuit 4 transmits the control signal ECS to the oscillation circuit 2 so as to instruct the oscillation circuit 2 to interrupt the operation and fix the output of the clock source SC. As a result, the stop mode is realized in which both of the clocks MC and PC are fixed. As described above, the transition from the wait mode to the stop mode in the microcomputer 101 can be performed by the supply of the external request signal ERB without the operation of the CPU 5.

Also the transition from the normal mode to the stop mode can be realized similarly to the transition from the wait mode to the stop mode by supplying the second predetermined signal transmitted from the power-supply-voltage detection circuit to the ICU 6 as the external request signal ERB. The control-signal generating circuit 4, thereby, transmits the control signal ECS to control the oscillation circuit 2 to fix the clock source SC. Accordingly, also the transition from the normal mode to the stop mode in the microcomputer 101 can be realized by supplying the external request signal ERB without the operation of the CPU 5.

As described above, the release of the stop mode and that of the wait mode in the microcomputer 101 are substantially similar to those in the conventional device 150. The transition from the stop mode to the wait mode will briefly be described. When the power supply voltage has been raised to exceed, for example, the operating limit voltage for the CPU 5, the power-supply-voltage detection circuit transmits the first predetermined signal to the external terminal 13A. The ICU 6 receives the supplied signal as the external request signal ERA so as to transmit the control input signal EI or the trigger signal SS (another control input signal) to the control-signal generating circuit 4 similarly to the conventional device 150.

When the control-signal generating circuit 4 has received the control input signal EI or the trigger signal SS, the control-signal generating circuit 4 transmits the control signal ECS so as to control the oscillation circuit 2 to release the clock source SC from fixation. As a result, the output of the clock PC is restarted so that the wait mode is realized. Even if the ICU 6 transmits the trigger signal SS, the trigger signal SS does not serve as the interruption request signal for the CPU 5. Thus, the CPU 5 does not operate, which is similar to the conventional device 150.

The transition from the wait mode or the stop mode to the normal mode is performed similarly to the conventional device 150. Specifically, the trigger signal SS is transmitted from the ICU 6 to the control-signal generating circuit 4 in response to the external request signal ER or the internal request signal IR. Thus, release of the wait mode is instructed. Moreover, the trigger signal SS is also transmitted to the CPU 5 so that execution of the predetermined interruption process is requested.

As described above, both of the transition from the normal mode to the wait mode and that from the normal mode or the wait mode to the stop mode in the device 101 are performed in response to the supply of the external request signals ERA and ERB without the operation of the CPU 5. Therefore, the temporal enlargement of power consumption which takes place on these transitions can be prevented. As a result, a stable operation can be performed and thus the reliability of the device can be improved. Since the stop mode brings the suspension of the operation of the oscillation circuit 2, the power consumption in the stop mode can significantly be saved.

Second Preferred Embodiment

Figure 3:
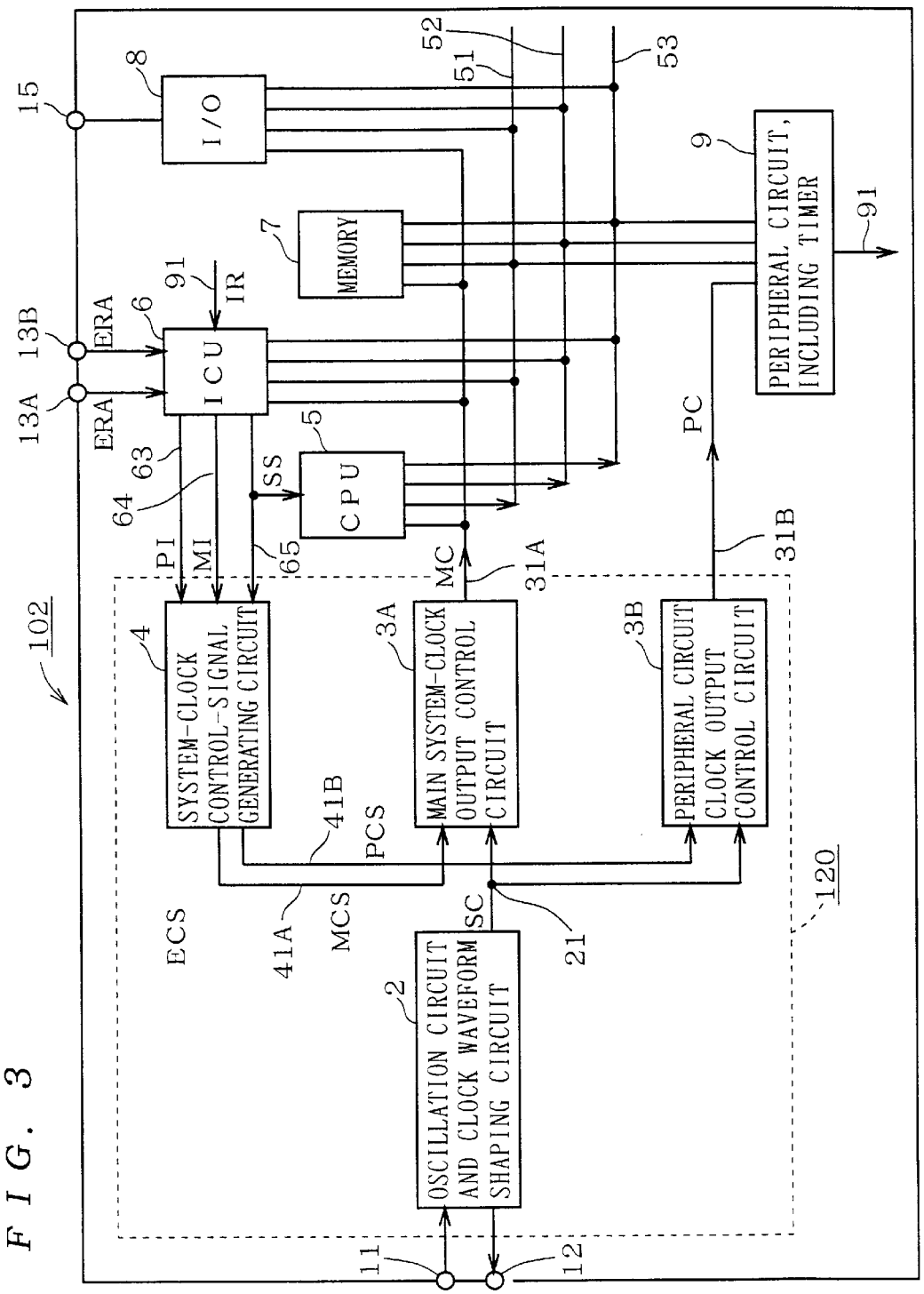
FIG. 3 is a block diagram showing a device according to a second preferred embodiment.

FIG. 3 is a block diagram showing the structure of a microcomputer according to a second embodiment of the present invention. A microcomputer 102 comprises signal lines 64 and 63 for transmitting control input signal MI for controlling the output of the control signal MCS and control input signal PI for controlling the output of the control signal PCS from the ICU 6 to the control-signal generating circuit 4. The signal lines 64 and 63 are disposed in place of the signal lines 61 and 62 of the device 101.

The signal line 42 (see FIG. 1) for transmitting the control signal ECS from the control-signal generating circuit 4 to the oscillation circuit 2 is removed in the second embodiment. Thus, the control-signal generating circuit 4 does not control the oscillation circuit 2. That is, the device 102 is characteristically different from the device 101 in that the stop mode is realized in such a manner that the control circuits 3A and 3B fix the outputs of the clocks MC and PC in place of interrupting the oscillation circuit 2.

The control input signal MI is a main-system clock control input signal for instructing the control signal generating circuit 4 to control of the control circuit 3A by using the control signal MCS. The signal line 64 is a main-system clock control input signal line for transmitting the control input signal MI. The control input signal PI is a peripheral-circuit clock control input signal for instructing the control-signal generating circuit 4 to control the control circuit 3B by using the control signal PCS. The signal line 63 is a peripheral-circuit clock control input signal line for transmitting the control input signal PI.

The control input signals MI and PI are transmitted by the ICU 6 in response to external request signals ERA and ERB which are supplied to the ICU 6 through the external terminal 13A and 13B. Similarly to the signal lines 61 and 62 shown in the block diagram FIG. 2, the signal lines 63 and 64 are directly connected to the output of the judging circuit 68 (not shown). First and second predetermined signals transmitted from an external power-supply-voltage detection circuit connected to the device 102 are received through external terminal 13A and 13B. The received signals are transmitted to the ICU 6 as external request signals ERA and ERB respectively.

When the transition of the clock mode from the normal mode to the wait mode is performed, the elements of the device 102 are operated as follows.

During the normal mode, the judging circuit 68 is so set that the external request signals ERA and ERB are permitted similarly to the case in the device 101. When the external power-supply-voltage detection circuit has detected reduction of the power supply voltage to the first reference voltage and thus the external request signal ERA has been supplied to the ICU 6, the external request signal ERA is transmitted to the control-signal generating circuit 4 as the control input signal MI. When the control-signal generating circuit 4 has received the control input signal MI, the control-signal generating circuit 4 is operated similarly to the case in which the control-signal generating circuit 4 receives the trigger signal SQ (see FIG. 8).

Specifically, the control-signal generating circuit 4 transmits the control signal MCS to the control circuit 3A so as to instruct the control circuit 3A to fix the output of the clock MC. As a result, the wait mode is realized in which the clock MC is fixed and the output of the clock PC is continued. Thus, also the device 102 is able to perform the transition from the normal mode to the wait mode in accordance with supply of the external request signal ERA without the operation of the CPU 5.

When the transition of the clock mode from the wait mode to the stop mode is performed, the elements of the device 102 are operated as follows.

Similarly to the device 101, setting of the ICU 6 in the normal mode is maintained also in the wait mode. Therefore, when the external power-supply-voltage detection circuit has detected reduction of the power supply voltage to the second reference voltage and thus the external request signal ERB has been supplied to the ICU 6, the external request signal ERB is transmitted to the control-signal generating circuit 4 as the control input signal PI.

When the control-signal generating circuit 4 has received the control input signal PI, the control-signal generating circuit 4 transmits the control signal PCS to the control circuit 3B so as to instruct the control circuit 3B to fix the output of the clock PC. As a result, the stop mode is realized in which both of the clocks MC and PC are fixed. Thus, the transition of the wait mode to the stop mode can be performed in response to the supplied external request signal ERB without the operation of the CPU 5 in the device 102.

Also the transition from the normal mode to the stop mode is realized similarly to the transition from the wait mode to the stop mode by supplying the second predetermined signal transmitted from the power-supply-voltage detection circuit to the ICU 6 as the external request signal ERB. The control-signal generating circuit 4 transmits both of the control signals MCS and PCS so as to control the control circuits 3A and 3B to fix both of the clocks MC and PC. Thus, also the transition from the normal mode to the stop mode can be performed by supplying the external request signal ERB without the operation of the CPU 5 in the microcomputer 102.

The transition from the stop mode to the wait mode will briefly be described. When the power supply voltage has been raised to exceed, for example, the operating limit voltage for the CPU 5, the first predetermined signal is supplied from the power-supply-voltage detection circuit to the external terminal 13A. Thus, the ICU 6 receives the first predetermined signal as the external request signal ERA so as to transmit the supplied signal to the control-signal generating circuit 4 as the control input signal PI or the trigger signal SS similarly to the conventional device 150.

When the control-signal generating circuit 4 has received the control input signal PI or the trigger signal SS, the control-signal generating circuit 4 transmits the control signal PCS so as to control the control circuit 3B to release the clock PC from fixation. As a result, the output of the clock PC is restarted so that the wait mode is realized. Even if the CPU 6 transmits the trigger signal SS, the trigger signal SS does not serve as the interruption request signal for the CPU 5. Thus, the CPU 5 does not operate, which is similar to the conventional device 150.

The transition from the wait mode and the stop mode to the normal mode is performed similarly to the conventional device 150 and the apparatus 101.

As described above, in the microcomputer 102, both of the transition from the normal mode to the wait mode and that from the normal mode or the wait mode to the stop mode are performed in response to the supply of the external request signals ERA and ERB without the operation of the CPU 5. Therefore, temporal enlargement of the power consumption occurring on these transitions can be prevented. As a result, a stable operation can be realized and the reliability of the device can be improved.

The stop mode can be realized without the interruption of the operation of the oscillation circuit 2. Therefore, a microcomputer which is not structured in such a manner that the control-signal generating circuit 4 controls the oscillation circuit 2 through the signal line 42 (see FIG. 1) can advantageously be formed into the device 102 only by changing the wiring pattern relating to the signal lines 63 and 64.

Third Embodiment

Figure 4:
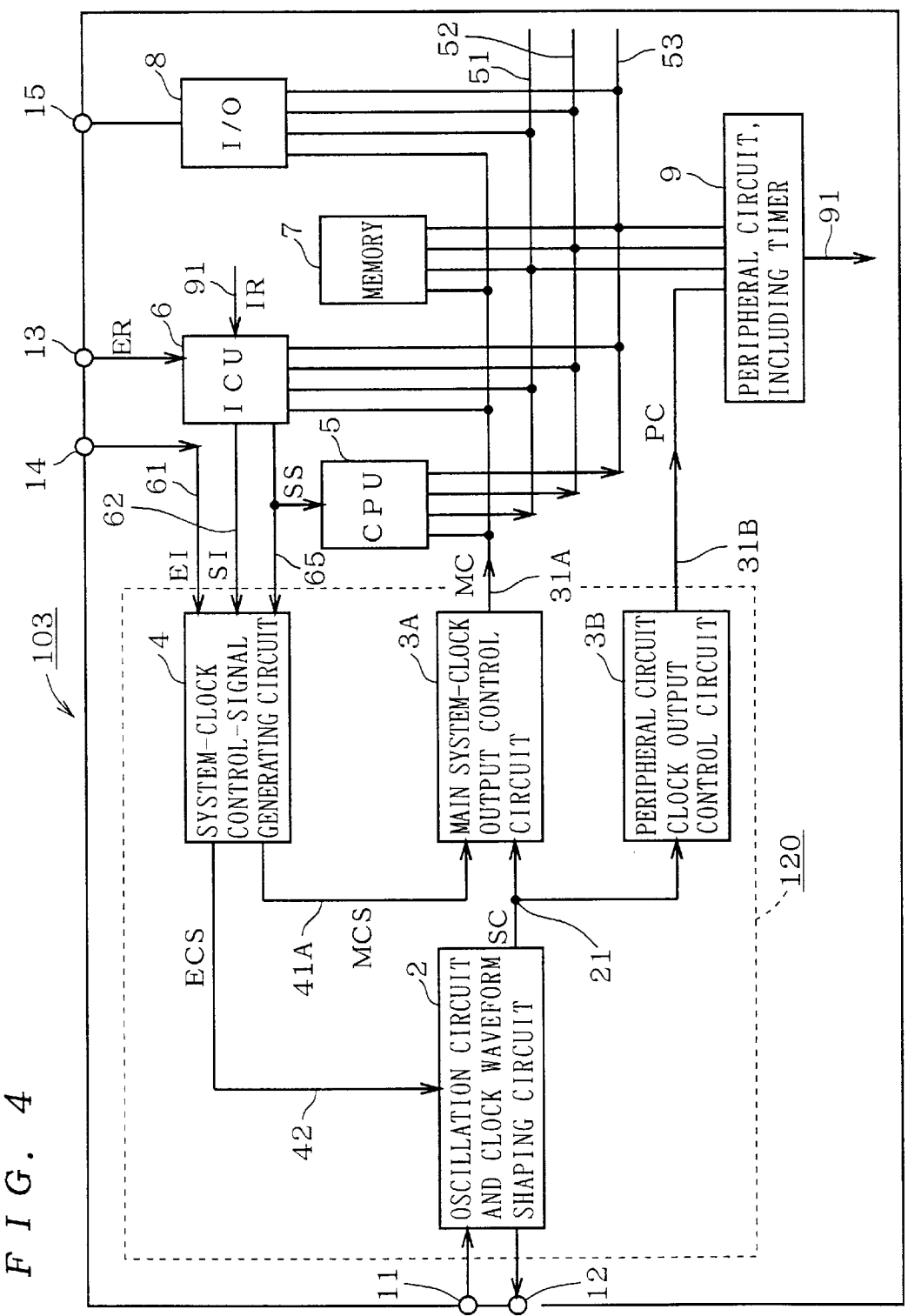
FIG. 4 is a block diagram showing a device according to a third preferred embodiment.

FIG. 4 is a block diagram showing the structure of a microcomputer according to a third embodiment of the present invention. The device 103 is characteristically different from the device 101 in that the control input signal EI for controlling the output of the control signal ECS is not relayed by the ICU 6. As an alternative, the control input signal EI is directly supplied from an external terminal 14 to the control-signal generating circuit 4 through the signal line 61. The signal line 61 is separated from the ICU 6. The external terminal 14 is disposed to serve as an external clock control input terminal directly connected to the control-signal generating circuit 4.

When the transition from the normal mode and wait mode to the stop mode is performed, the control input signal EI is directly supplied to the control-signal generating circuit 4 through the external terminal 14 and the signal line 61. When the control input signal EI has been supplied to the control-signal generating circuit 4, the control-signal generating circuit 4 performs an operation similar to the operation which is performed by the device 101 so as to fix the clock source SC so that the stop mode is realized.

Also when the transition from the stop mode to the wait mode is performed, the control input signal EI is directly supplied to the control-signal generating circuit 4 through the external terminal 14 and the signal line 61. When the control-signal generating circuit 4 has received the control input signal EI, the operation similar to that in the device 101 is performed so that fixation of the clock source SC is released. Thus, the transition to the wait mode can be realized.

For the purpose of identification which is performed by the control-signal generating circuit 4 whether the supplied control input signal EI serves as the signal to instruct the transition to the stop mode or the same to instruct release of the stop mode, for example, the falling edge of the control input signal EI may be assigned to the instruction of the transition to the stop mode and the rising edge may be assigned to the instruction of the release of the stop mode.

As described above, the device 103 is so structured that the control input signal EI is not relayed by the ICU 6, and is directly supplied to the control-signal generating circuit 4. Therefore, an effect can be obtained in that the circuit structure of the ICU 6 can be simplified in addition to the effect obtainable from the device 102.

Fourth Embodiment

Figure 5:
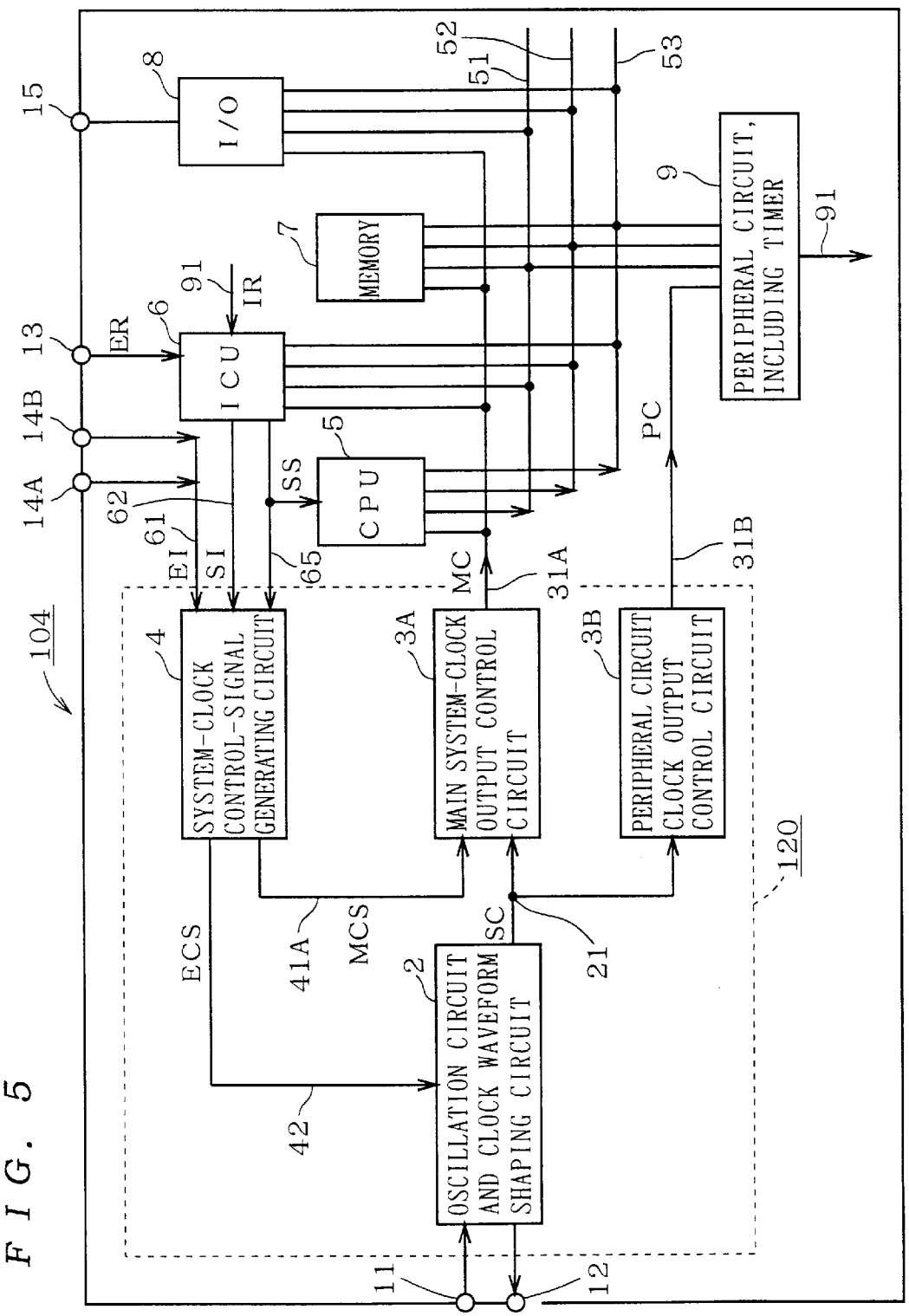
FIG. 5 is a block diagram showing a device according to a fourth preferred embodiment.

FIG. 5 is a block diagram showing the structure of a microcomputer according to a fourth embodiment of the present invention. The device 104 is characteristically different from the device 103 in that the external terminal 14 for relaying the control input signal EI for controlling the output of the control signal ECS is divided into two external terminals 14A and 14B. The external terminal 14A is supplied with the control input signal EI for instructing the transition to the stop mode. On the other hand, the external terminal 14B is supplied with the control input signal EI for instructing the release of the stop mode. The signals of the two systems are supplied through external terminals 14A and 14B individually.

For example, the control-signal generating circuit 4 controls the oscillation circuit 2 to fix the clock source SC in response to the rising edge of the control input signal EI supplied through the external terminal 14A. Thus, the stop mode is realized. The control-signal generating circuit 4 controls the oscillation circuit 2 to release the clock source SC from fixation in response to the rising edge of the control input signal EI supplied through the external terminal 14B. Thus, the stop mode is released. The operation of the control-signal generating circuit 4 in response to the control input signals EI and SI and the transition of the clock mode which is performed in accordance with the operation are similar to those in the device 103. Therefore, they are omitted from description.

Fifth Embodiment

FIG. 6 is a block diagram showing the structure of a microcomputer according to a fifth embodiment of the present invention. The device 105 is characteristically different from the device 104 in that both of the control input signals EI and SI for instructing the operation of the control-signal generating circuit 4 can directly be supplied through the external terminals 14A and 14B without passage through the ICU 6 and further the signals can directly be supplied from the peripheral circuit 9 through signal lines 91A and 91B without passage through the ICU 6. Therefore, the circuit structure of the ICU 6 can advantageously furthermore be simplified.

The external request signal ERA supplied through the external terminal 14A is supplied to the control-signal generating circuit 4 through the signal line 61 as the control input signal EI. Similarly, an internal request signal IRA serving as the internal interruption request signal is transmitted from a timer or the like included in the peripheral circuit 9. The internal request signal IRA can be supplied to the control-signal generating circuit 4 through the signal line 91A as the control input signal EI.

Similarly to the control-signal generating circuit 4 of the device 101, the control-signal generating circuit 4 controls the oscillation circuit 2 in response to the control input signal EI to start fixing the clock source SC and release of the fixation. That is, both the start of the stop mode and the release of the same can be performed in response to any one of the external request signal ERA and the internal request signal IRA without the operation of the ICU 6.

The external request signal ERB supplied through the external terminal 14B is transmitted to the control-signal generating circuit 4 through the signal line 62 as the control input signal SI. Similarly, the internal request signal IRB, which is the internal interruption request signal, is transmitted from a timer or the like of the peripheral circuit 9. The internal request signal IRB can be supplied to the control-signal generating circuit 4 through a signal line 91B as the control input signal SI.

Similarly to the control-signal generating circuit 4 of the device 101, the control-signal generating circuit 4 controls the control circuit 3A in response to the control input signal SI. Thus, start of the fixation and the release of the fixation of the clock MC can be performed. As a result, both the start and the release of the wait mode can be realized in response to any one of the external request signal ERB and the internal request signal IRB without the operation of the ICU 6.

The operation of the control-signal generating circuit 4 which is performed in response to the control input signal EI and the control input signal SI and the transition of the clock mode which is performed in accordance with the operation are the same as those in the microcomputer 101. Therefore, they are omitted from description.

Sixth Embodiment

FIG. 7 is a block diagram showing the structure of a microcomputer according to a sixth embodiment of the present invention. The device 106 is characteristically different from the device 105 in that the device 106 has a power-supply-voltage detection circuit 200 and an output signal from the power-supply-voltage detection circuit 200 can be supplied to the signal lines 61 and 62. The power-supply-voltage detection circuit 200 is included in the single chip together with the other circuits forming the device 106.

The power-supply-voltage detection circuit 200 has a reference-voltage generating circuit 20 and a clock-mode change request signal generating circuit 10. The reference-voltage generating circuit 20 has a circuit for generating the first and second reference voltages and a comparison circuit for subjecting the reference voltages and the power supply voltage to comparisons which are omitted from illustration. The comparison circuit generates a detection signal CV indicating a result of the comparison between the power supply voltage and the first reference voltage. Moreover, the comparison circuit generates a detection signal PV indicating a result of the comparison between the power supply voltage and the second reference voltage.

The detection signal CV which is a CPU operating-voltage-range detection signal is transmitted to the clock-mode change request signal generating circuit 10 through a signal line 201. Similarly, the detection signal PV which is a peripheral circuit operating-voltage-range detection signal is transmitted to the request-signal generating circuit 10 through a signal line 202. The request-signal generating circuit 10 transmits request signals WT and ST in response to the detection signals CV and PV.

When the power supply voltage reduces down to a level lower than the first reference voltage, the request signal WT is transmitted to instruct the transition from the normal mode to the wait mode. When the power supply voltage further reduces to a level not higher than the second reference voltage, the request signal ST is transmitted to instruct the transition from the wait mode to the stop mode. When the power supply voltage rises up to a level higher than the second reference voltage, the request signal ST is transmitted to require the release of the stop mode and to thereby instruct the transition from the stop mode to the wait mode.

When the power supply voltage is raised, third reference voltage which is different from the second reference voltage may be employed as a subject of the comparison and thereby the request signal ST for instructing the transition from the stop mode to the wait mode may be transmitted. That is, the same reference voltages are not required as the subject of the comparison of the power supply voltage between one transition and the reverse transition.

The request signal WT is, as the control input signal SI, supplied to the control-signal generating circuit 4 through a signal line 101 and the signal line 62. On the other hand, the request signal ST is, as the control input signal EI, supplied to the control-signal generating circuit 4 through a signal line 102 and the signal line 61. The operation of the control-signal generating circuit 4 which is performed in response to the control input signal EI and the control input signal SI and the transition of the clock mode which is performed in accordance with the operation are similar to those in the device 101. Therefore, they are omitted from description.

As described above, the device 106 includes the power-supply voltage detection circuit 200. Therefore, the transition of the clock mode is automatically performed in accordance with the level of the power supply voltage. Therefore, it is not required to contact the power-supply-voltage detection circuit to the device 106 as an external device. Accordingly, a device which uses the device 106 can easily be designed.

While the invention has been shown and described in detail, the foregoing description is in all aspects illustrative and not restrictive. It is therefore understood that numerous other modification and variations can be devised without departing from the scope of the invention.

We claim:

1. A microcomputer for a single semiconductor chip having integrated circuit elements comprising:
   a main circuit, including at least a central processing unit (CPU), a memory which is accessed by said CPU and an interruption control unit (ICU) for controlling an interruption process which is performed by said CPU in response to an interruption request signal;
   a reference-clock control circuit for supplying a clock to said main circuit, where said reference-clock control circuit transitions between at least two modes in response to control input signals, said at least two modes including a normal mode in which said clock is supplied to all of circuits included in said main circuit which are operated in synchronization with said clock and a small power consumption mode in which supply of said clock to at least a portion of said circuits, including said CPU, in said main circuit is interrupted;
   a first external terminal for relaying to said ICU an external request signal supplied from outside as said interruption request signal; and
   a signal line for transmitting a signal output from said ICU in response to said external request signal to said reference-clock control circuit as said control input signal without relay of said signal to said CPU, whereby said transitions are performed without intervention of said CPU.

2. A microcomputer according to claim 1, further comprising a second external terminal for relaying, to said signal line, an external input signal supplied from outside as said control input signal.

3. A microcomputer according to claim 1, wherein
   said main circuit further includes a peripheral circuit which generates and transmits an internal request signal to said ICU as said interruption request signal, and
   said ICU also responds to said internal request signal so as to transmit said control input signal.

4. A microcomputer according to claim 1, wherein
   said main circuit further includes a peripheral circuit for generating an internal request signal as said control input signal so as to transmit the same to said signal line.

5. A microcomputer according to claim 4, wherein
   said small power consumption mode includes a wait mode in which supply of said clock to said peripheral circuit is not interrupted and a stop mode in which supply of said clock to any circuit included in said main circuit is interrupted, and
   said reference-clock control circuit further makes transition between said wait mode and said stop mode in response to said control input signal.

6. A microcomputer according to claim 5, further comprising a power-supply-voltage detection circuit as part of said circuit elements, wherein said power-supply-voltage detection circuit monitors source voltage which is supplied to said microcomputer so as to transmit a signal to instruct transition to said wait mode when said source voltage reduces to a level lower than a predetermined first reference voltage, and to transmit a signal to instruct transition to said stop mode when said source voltage reduces to a level lower than a predetermined second reference voltage, to said signal line as said control input signal.

7. A microcomputer according to claim 5, wherein
said reference-clock control circuit includes:
an oscillation circuit for generating a clock source;
a first control circuit for supplying said clock source as said clock to each circuit requiring said clock included in said main circuit except for said peripheral circuit;
a second control circuit for supplying said clock source to said peripheral circuit as said clock; and
a control-signal generating circuit which supplies a control signal to said first and second control circuits in response to said control input signal so as to execute a control of said first and second control circuits, and
said control-signal generating circuit so executes said control that both of said first and second control circuits interrupt supply of said clock when said control input signal instructs transition to said stop mode,
said first control circuit interrupts supply of said clock and said second control circuit supplies said clock when said control input signal instructs transition to said wait mode, and
both of said first and second control circuits supply said clocks when said control input signal instructs transition to said normal mode.

8. A microcomputer according to claim 5, wherein
said reference-clock control circuit includes:
an oscillation circuit for generating a clock source;
a first control circuit for supplying said clock source as said clock to each circuit requiring said clock included in said main circuit except for said peripheral circuit;
a second control circuit for supplying said clock source to said peripheral circuit as said clock; and
a control-signal generating circuit which supplies a control signal to said oscillation circuit and said first control circuit in response to said control input signal so as to execute a control of oscillation circuit and said first control circuit, and
said control-signal generating circuit so executes said control that said oscillation circuit interrupts generation of said clock source when said control input signal instructs transition to said stop mode,
said oscillation circuit generates said clock source and said first control circuit interrupts supply of said clock when said control input signal instructs transition to said wait mode, and
said oscillation circuit generates said clock source and said first control circuit supplies said clock when said control input signal instructs transition to said normal mode.

9. A microcomputer according to claim 3, wherein
said small power consumption mode includes a wait mode in which supply of said clock to said peripheral circuit is not interrupted and a stop mode in which supply of said clock to any circuit included in said main circuit is interrupted, and
said reference-clock control circuit further makes transition between said wait mode and said stop mode in response to said control input signal.

10. A microcomputer according to claim 9, further comprising a power-supply-voltage detection circuit as part of said circuit elements, wherein said power-supply-voltage detection circuit monitors source voltage which is supplied to said microcomputer so as to transmit a signal to instruct transition to said wait mode when said source voltage reduces to a level lower than a predetermined first reference voltage, and to transmit a signal to instruct transition to said stop mode when said source voltage reduces to a level lower than a predetermined second reference voltage, to said signal line as said control input signal.

11. A microcomputer according to claim 9, wherein said reference-clock control circuit includes:

an oscillation circuit for generating a clock source;

a first control circuit for supplying said clock source as said clock to each circuit requiring said clock included in said main circuit except for said peripheral circuit, a second control circuit for supplying said clock source to said peripheral circuit as said clock; and a control-signal generating circuit which supplies a control signal to said first and second control circuits in response to said control input signal so as to execute a control of said first and second control circuits, and said control-signal generating circuit so executes said control that both of said first and second control circuits interrupt supply of said clock when said control input signal instructs transition to said stop mode, said first control circuit interrupts supply of said clock and said second control circuit supplies said clock when said control input signal instructs transition to said wait mode, and both of said first and second control circuits supply said clocks when said control input signal instructs transition to said normal mode.

12. A microcomputer according to claim 9, wherein said reference-clock control circuit includes:

an oscillation circuit for generating a clock source;

a first control circuit for supplying said clock source as said clock to each circuit requiring said clock included in said main circuit except for said peripheral circuit;

a second control circuit for supplying said clock source to said peripheral circuit as said clock; and a control-signal generating circuit which supplies a control signal to said oscillation circuit and said first control circuit in response to said control input signal so as to execute a control of oscillation circuit and said first control circuit, and said control-signal generating circuit so executes said control that said oscillation circuit interrupts generation of said clock source when said control input signal instructs transition to said stop mode, said oscillation circuit generates said clock source and said first control circuit interrupts supply of said clock when said control input signal instructs transition to said wait mode, and said oscillation circuit generates said clock source and said first control circuit supplies said clock when said control input signal instructs transition to said normal mode.

* * * * *